US012562018B2

(12) United States Patent
Ishiguro et al.

(10) Patent No.: US 12,562,018 B2
(45) Date of Patent: Feb. 24, 2026

(54) BILL HANDLING APPARATUS AND FAILURE DETERMINATION METHOD

(71) Applicants: FUJITSU FRONTECH LIMITED, Tokyo (JP); Fujitsu Frontech Systems Limited, Maebashi (JP)

(72) Inventors: Keita Ishiguro, Inagi (JP); Rompei Sugawara, Inagi (JP)

(73) Assignees: FUJITSU FONTECH LIMITED, Tokyo (JP); FUJITSU FRONTECH SYSTEMS LIMITED, Gunma (JP)

( * ) Notice: Subject to any disclaimer, the term of this patent is extended or adjusted under 35 U.S.C. 154(b) by 148 days.

(21) Appl. No.: 18/453,848

(22) Filed: Aug. 22, 2023

(65) Prior Publication Data

US 2023/0394902 A1 Dec. 7, 2023

Related U.S. Application Data

(63) Continuation of application No. PCT/JP2021/011929, filed on Mar. 23, 2021.

(51) Int. Cl.
*G07D 11/235* (2019.01)
*G07D 11/40* (2019.01)

(52) U.S. Cl.
CPC ........... *G07D 11/235* (2019.01); *G07D 11/40* (2019.01); *B65H 2511/52* (2013.01); *B65H 2515/50* (2013.01); *G07D 2211/00* (2013.01)

(58) Field of Classification Search
CPC ........ G07D 11/235; G07D 11/40; G07D 7/02; B65H 2511/52; B65H 2402/10; B65H 2515/50; G01H 1/003; G01M 13/028
See application file for complete search history.

(56) References Cited

U.S. PATENT DOCUMENTS

| | | | | |
|---|---|---|---|---|
| 11,486,483 | B1 * | 11/2022 | Bechhoefer ............. | F16H 59/38 |
| 2005/0050423 | A1 | 3/2005 | Yasukawa et al. | |
| 2006/0207355 | A1 * | 9/2006 | Yasukawa ................ | B41J 29/38 714/742 |
| 2013/0116937 | A1 * | 5/2013 | Calhoun ................. | G06F 17/00 702/35 |

FOREIGN PATENT DOCUMENTS

| | | |
|---|---|---|
| JP | 2005-033559 | 2/2005 |
| JP | 2011-008336 | 1/2011 |
| JP | 2019-168790 | 10/2019 |
| JP | 2019168790 A | * 10/2019 |

OTHER PUBLICATIONS

Extended European Search Report issued in counterpart European Application No. 21932902.6 dated Apr. 17, 2024.
International Search Report issued in International Application No. PCT/JP2021/011929 dated May 18, 2021.

* cited by examiner

*Primary Examiner* — Jeremy R Severson
(74) *Attorney, Agent, or Firm* — STAAS & HALSEY LLP

(57) ABSTRACT

In a bill handling apparatus 1, a vibration detection sensor 51A to 51H detects a vibration of a field repair unit 3, 4, 6, 7*a* to 7*d*, 8, and a determining unit 52 determines whether there is a failure in the field repair unit 3, 4, 6, 7*a* to 7*d*, 8 based on the vibration detected by the vibration detection sensor 51A to 51H. For example, the determining unit 52 subjects the vibration detected by the vibration detection sensor 51A to 51H to frequency analysis, and determines that a failure has occurred in the field repair unit 3, 4, 6, 7*a* to 7*d*, 8 when a frequency of a frequency component having a maximum amplitude level in an analysis result of the frequency analysis is lower than a reference value.

2 Claims, 2 Drawing Sheets

BILL HANDLING APPARATUS AND FAILURE DETERMINATION METHOD

CROSS-REFERENCE TO RELATED APPLICATIONS

This application is a continuation of International Application No. PCT/JP2021/011929, filed on Mar. 23, 2021, the entire contents of which are incorporated herein by reference.

FIELD

The present invention relates to a bill handling apparatus and a failure determination method.

BACKGROUND

Some kinds of bill handling apparatuses, such as automatic teller machine, include a field repair unit that is individually replaceable. Examples of the field repair unit include a money receiving/paying unit that performs reception and payment of bills, a storage unit that temporarily stores bills, storage cassettes that store bills by denomination, and the like.

Examples of related-art is described in Japanese Laid-open Patent Publication No. 2011-008336.

When a failure occurs in a field repair unit, use of the bill handling apparatus becomes difficult.

Accordingly, in the present application, a technique enabling to detect a failure of a field repair unit is proposed.

SUMMARY

According to an aspect of an embodiment, a bill handling apparatus in the present application includes a field repair unit, a sensor and a determining unit. The sensor detects a vibration of the field repair unit. The determining unit determines whether there is a failure in the field repair unit based on the vibration.

DESCRIPTION OF EMBODIMENTS

Figure 1:
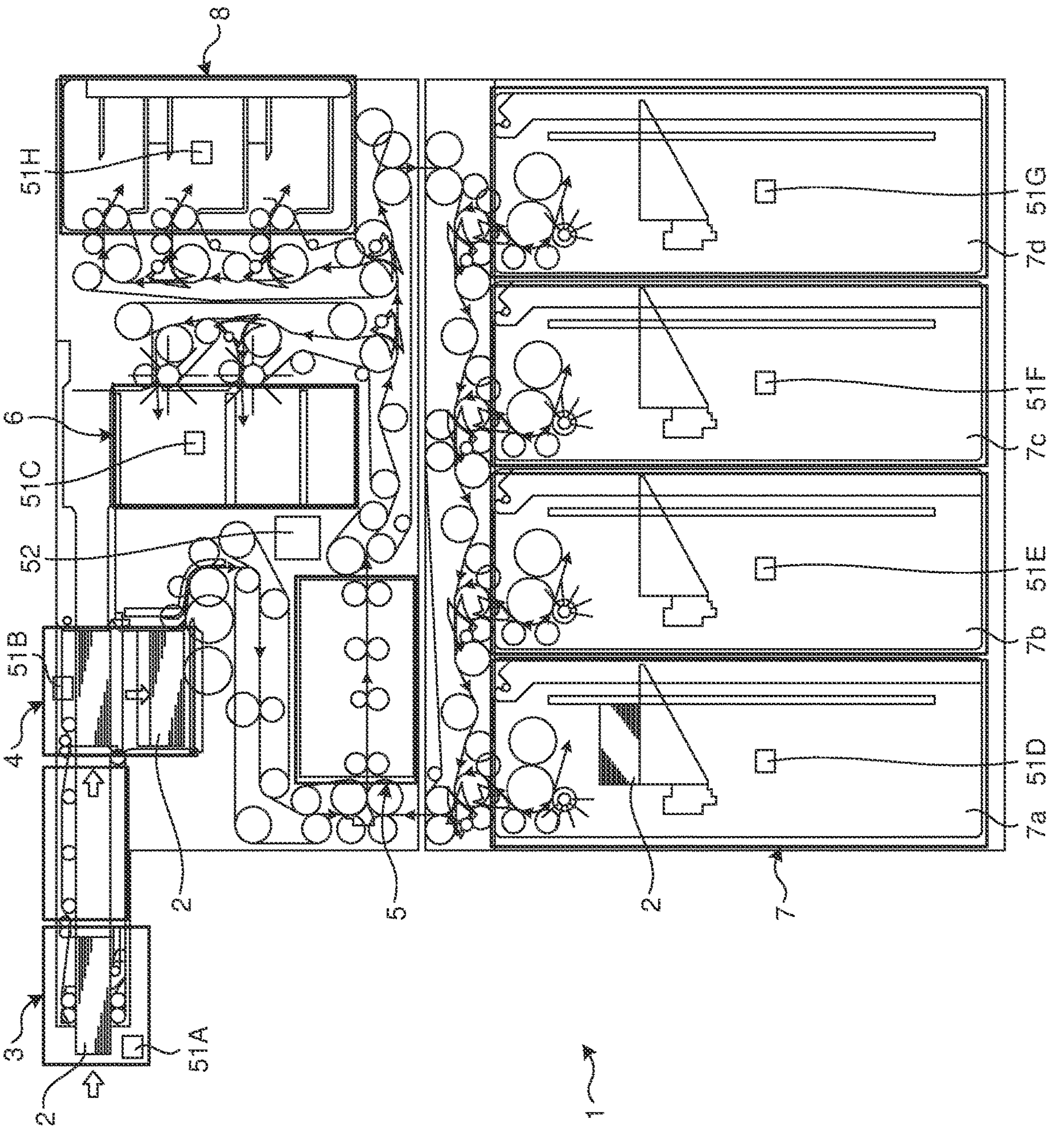
FIG. 1 is a diagram illustrating a configuration example of a first bill handling apparatus according to a first embodiment of the present disclosure.
Figure 2:
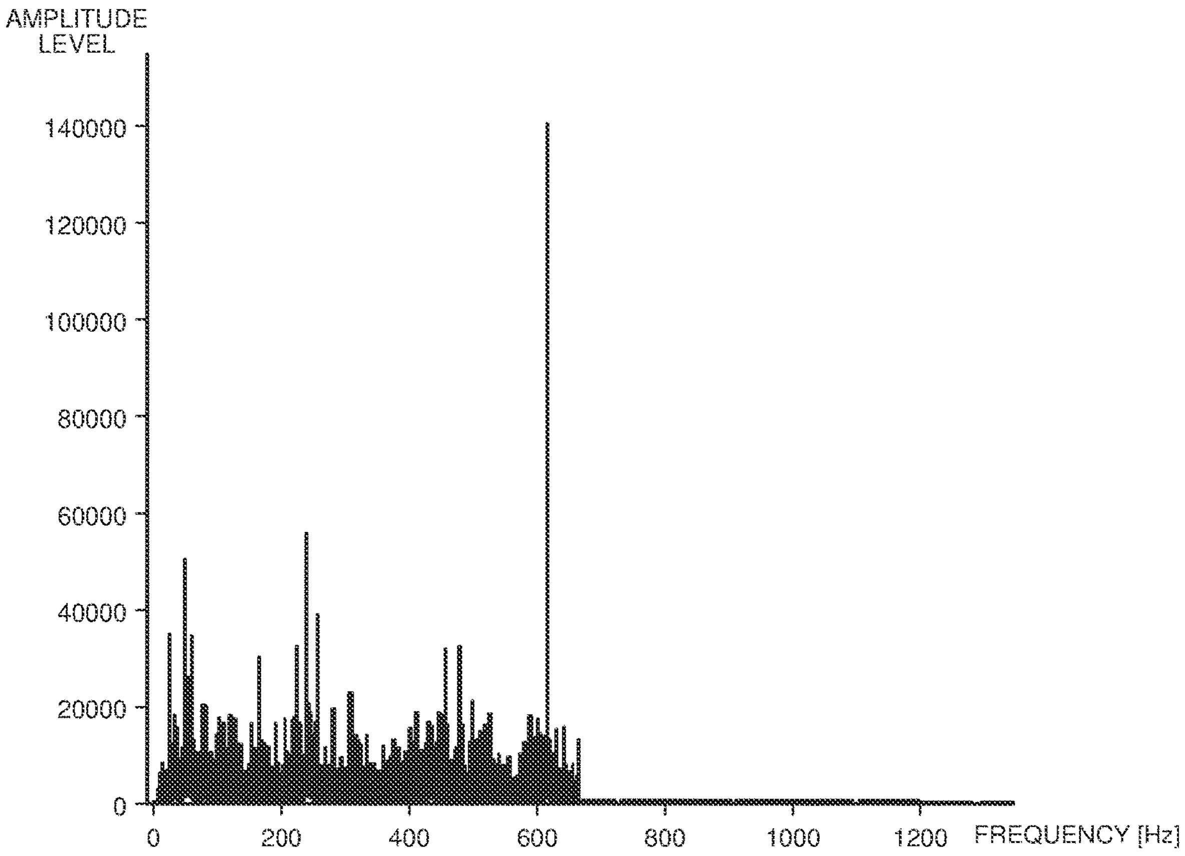
FIG. 2 is a diagram illustrating an example of a frequency analysis result of vibration data of the first embodiment of the present disclosure.

Embodiments of the present disclosure will be described below based on the drawings. In the drawings, the same components are denoted by the same reference symbols.

[a] First Embodiment

<Configuration of Bill Handling Apparatus>

FIG. 1 is a diagram illustrating a configuration example of a bill handling apparatus of a first embodiment of the present disclosure.

As illustrated in FIG. 1, a bill handling apparatus 1 includes a money receiving/paying unit 3 that receives and pays a bill 2, a first storage unit 4 that temporarily stores the bill put by the money receiving/paying unit 3, a discriminating unit 5 that discriminates the bill transferred from the first storage unit 4, and a second storage unit 6 that temporarily stores the bill 2 transferred from the discriminating unit 5. Moreover, the bill handling apparatus 1 includes a returning unit 7 that stores the bill 2 transferred from the discriminating unit 5, and that returns the bill 2 by ejecting therefrom, and a rejecting unit 8 that stores the bill 2 that has abnormal thickness or length, the bill 2 that is damaged, and the like.

The bill 2 that is put in from the money receiving/paying unit 3 is stored in the first storage unit 4, and then discriminated by the discriminating unit 5. The bill 2 from which something abnormal is detected is transferred from the discriminating unit 5 to the rejecting unit 8 to be stored therein. On the other hand, the bill 2 from which nothing abnormal is detected by the discriminating unit 5 is stored in the second storage unit 6.

When return processing is performed for the bill 2 that has put in from the money receiving/paying unit 3, the bill 2 stored in the second storage unit 6 is transferred to the money receiving/paying unit 3, and is returned from the money receiving/paying unit 3. On the other hand, when money receiving processing is performed for the bill 2 that has put in from the money receiving/paying unit 3, the bill stored in the second storage unit 6 is transferred to the first storage unit 4, and is transferred from the first storage unit 4 to the discriminating unit 5, and is then transferred from the discriminating unit 5 to the returning unit 7, and is stored in storage cassettes 7*a*, 7*b*, 7*c*, and 7*d* of the returning unit 7 by denomination.

Furthermore, when the bill 2 stored in the returning unit 7 is dispensed, the bill 2 stored in the returning unit 7 is transferred from the returning unit 7 to the discriminating unit 5, and is then transferred from the discriminating unit 5 to the second storage unit 6 to be stored in the second storage unit 6. The bill 2 that is stored in the second storage unit 6 is transferred to the money receiving/paying unit 3, and is dispensed from the money receiving/paying unit 3.

Each of the money receiving/paying unit 3, the first storage unit 4, the second storage unit 6, the storage cassettes 7*a* to 7*d*, and the rejecting unit 8 is one example of the field repair unit individually replaceable. Each of the money receiving/paying unit 3, the first storage unit 4, the second storage unit 6, the storage cassettes 7*a* to 7*d*, and the rejecting unit 8 includes a conveyance roller to convey the bill 2, and a conveyance motor to drive the conveyance roller. Because each of the money receiving/paying unit 3, the first storage unit 4, the second storage unit 6, the storage cassettes 7*a* to 7*d*, and the rejecting unit 8 has the conveyance motor, vibrations occur when the conveyance motor rotates.

To the money receiving/paying unit 3, a vibration detection sensor 51A is mounted, to the first storage unit 4, a vibration detection sensor 51B is mounted, to the second storage unit 6, a vibration detection sensor 51C is mounted, and to the rejecting unit 8, a vibration detection sensor 51H is mounted. Moreover, to the storage cassette 7*a*, a vibration detection sensor 51D is mounted, to the storage cassette 7*b*, a vibration detection sensor 51E is mounted, to the storage cassette 7*c*, a vibration detection sensor 51F is mounted, and to the storage cassette 7*d*, a vibration detection sensor 51G is mounted.

Furthermore, the bill handling apparatus 1 includes a determining unit 52.

Hereinafter, the money receiving/paying unit 3, the first storage unit 4, the second storage unit 6, the storage cassettes 7*a* to 7*d*, and the rejecting unit 8 can be collectively referred to as "field repair unit". Moreover, hereinafter, the vibration detection sensors 51A to 51H can be collectively referred to as "vibration detection sensor 51".

One example of a vibration detection sensor 51 is an acceleration sensor. The determining unit 52 is implemented by, for example, digital signal processor (DSP), a field programmable gate array (FPGA), or the like as hardware.

<Action of Bill Handling Apparatus>

The respective vibration detection sensors 51 mounted on the respective field repair units detect vibrations of the respective field repair units continuously over time, and outputs chronological data indicating values of vibrations (hereinafter, referred to as "vibration data" in some cases) to the determining unit 52. The vibration detection sensor 51A outputs vibration data of the money receiving/paying unit 3 to the determining unit 52, the vibration sensor 51B outputs vibration data of the first storage unit 4 to the determining unit 52, the vibration detection sensor 51C outputs vibration data of the second storage unit 6 to the determining unit 52, and the vibration detection sensor 51H outputs vibration data of the rejecting unit 8 to the determining unit 52. Moreover, the vibration detection sensor 51D outputs vibration data of the storage cassette 7*a* to the determining unit 52, the vibration detection sensor 51E outputs vibration data of the storage cassette 7*b* to the determining unit 52, the vibration detection sensor 51F outputs vibration data of the storage cassette 7*c* to the determining unit 52, and the vibration detection sensor 51G outputs vibration data of the storage cassette 7*d* to the determining unit 52.

The determining unit 52 determines whether there is a failure in a field repair unit for each of the field repair units based on vibrations detected by the vibration detection sensor 51.

The frequency of a vibration (hereinafter, referred to as "vibration frequency" in some cases) of the field repair unit varies according to a condition of the conveyance motor of the field repair unit. For example, when the rotation speed in a state in which a normal conveyance motor having 20 teeth continuously rotates at a uniform speed is 2000 rpm, and because the frequency corresponding to 2000 rpm is 33.3 Hz, the vibration frequency is $33.3\times20=666$ Hz. Therefore, the vibration frequency when an abnormal gear having 19 teeth with one tooth chipped out of 20 teeth rotates at 2000 rpm is $33.3\times19=633$ Hz. Furthermore, the vibration frequency when an abnormal gear having 18 teeth with two teeth chipped out of 20 teeth rotates at 2000 rpm is $33.3\times18=599$ Hz.

The determining unit 52 subjects the vibration data to frequency analysis. The determining unit 52 performs the frequency analysis of vibration data, for example, by using fast Fourier transform (FFT). FIG. 3 is a diagram illustrating one example of a frequency analysis result of vibration data of the first embodiment of the present disclosure. In the frequency analysis result shown in FIG. 3, a frequency component of 618 Hz has the maximum amplitude level. On the other hand, as described above, the vibration frequency when there is nothing abnormal in the conveyance motor is 666 Hz, and the vibration frequency when something abnormal has occurred in the conveyance motor is 633 Hz or 599 Hz.

Accordingly, the determining unit 52 determines, setting a reference value to, for example, 640 Hz, that there is a failure in the field repair unit when the frequency of a frequency component having the maximum amplitude level in a frequency analysis result (hereinafter, referred to as "maximum level frequency" in some cases) is lower than the reference value of 640 Hz. On the other hand, when the maximum frequency level is equal to or higher than the reference value of 640 Hz, the determining unit 52 determines that there is no failure occurring in the field repair unit. Therefore, for example, when the maximum level frequency is 618 Hz as shown in FIG. 3, the determining unit 52 determines that a failure has occurred in the field repair unit.

When it is determined that a failure has occurred in a field repair unit, the determining unit 52 notifies of occurrence of a failure in the field repair unit and information enabling to uniquely identify the field repair unit in which the failure has occurred to the outside of the bill handling apparatus 1.

As above, the first embodiment has been explained.

[b] Second Embodiment

<Action of Bill Handling Apparatus>

The determining unit 52 acquires vibration data regularly (for example, once a day) from the vibration detection sensor 51 per field repair unit, and analyzes changes of the vibration data collected over multiple days (for example, 30 days), and thereby predicts the time when a failure occurs in the field repair unit (hereinafter, "failure occurrence time" in some cases). Moreover, the determining unit 52 notifies of the predicted failure occurrence time to the outside of the bill handling apparatus 1. This enables to replace a field repair unit in a preventive manner before a failure occurs in the field repair unit.

For example, the determining unit 52 may predict the failure occurrence time based on a change of the maximum level frequency across multiple days.

Collection and analysis of the vibration data, prediction of the failure occurrence time, and notification of the failure occurrence time may be performed by a server or the like that is connected to the bill handling apparatus 1 through a network, in place of the determining unit 52.

As above, the second embodiment has been explained.

As described, the bill handling apparatus of the present disclosure (the bill handling apparatus 1 of the embodiments) includes field repair units (the money receiving/paying unit 3, the first storage unit 4, the second storage unit 6, the storage cassettes 7*a* to 7*d*, the rejecting unit 8 of the embodiments), a sensor (the vibration detection sensors 51A to 51H of the embodiments), and a determining unit (the determining unit 52 of the embodiments). The sensor detects vibrations of a field repair unit. The determining unit determines whether there is a failure in the field repair unit based on the vibrations detected by the sensor.

Thus, a failure of the field repair unit can be detected.

Moreover, the determining unit subjects the vibrations detected by the sensor to frequency analysis, and determines that a failure has occurred in a field repair unit when the frequency of a frequency component having the maximum amplitude level in an analysis result of the frequency analysis is lower than a reference value.

Thus, determination whether there is a failure occurring in a field repair unit can be performed accurately.

According to the disclosed technique, a failure of a field repair unit can be detected.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bill handling apparatus comprising:

a field repair unit including a conveyance motor having a plurality of teeth;

a sensor that detects a vibration of the field repair unit; and a processor that determines whether there is a chipping in the plurality of teeth of the conveyance motor based on the vibration, wherein the processor is configured to subject vibration data of the vibration detected by the sensor to a frequency analysis, and determine that the chipping in the plurality of teeth of the conveyance motor in the field repair unit has occurred, when a frequency of a frequency component having a maximum amplitude level in an analysis result of the frequency analysis is lower than a reference value.

2. A method for a bill handling apparatus that comprises a field repair unit including a conveyance motor having a plurality of teeth, the method comprising:

detecting a vibration of the field repair unit by a sensor;

subjecting vibration data of the vibration detected by the sensor to a frequency analysis; and determining that a chipping in the plurality of teeth of the conveyance motor in the field repair unit has occurred, when a frequency of a frequency component having a maximum amplitude level in an analysis result of the frequency analysis is lower than a reference value.

* * * * *